United States Patent [19]

Tan et al.

[11] Patent Number: 5,768,468
[45] Date of Patent: Jun. 16, 1998

[54] METHOD FOR PROGRAMMING A BROADCAST RECEIVER

[75] Inventors: Boon Tsong Tan; Chiew Mun Chang. both of Singapore, Singapore

[73] Assignee: Thomson Multimedia S.A., Courbevoie, France

[21] Appl. No.: 511,480

[22] Filed: Aug. 4, 1995

[30] Foreign Application Priority Data

Aug. 17, 1994 [GB] United Kingdom ............... 9416634

[51] Int. Cl.$^6$ .................. H04N 5/91; H04N 5/50
[52] U.S. Cl. ............................ 386/83; 348/732
[58] Field of Search ................. 386/83, 46, 92; 360/32; 455/186, 68; 368/731, 732, 734; H04N 5/91, 5/50

[56] References Cited

U.S. PATENT DOCUMENTS 4,879,611  11/1989  Fukui et al. ........................ 386/83

FOREIGN PATENT DOCUMENTS

0577283A2  1/1994  European Pat. Off. ...... H04N 5/782
2256333    4/1992  United Kingdom .......... H04N 5/782
2256546    4/1992  United Kingdom .......... H04N 5/782

OTHER PUBLICATIONS

1 Advertising Brochure of Star Sight Telecast Inc. copyright 1994.
2 Advertising Brochure of Star Sight Telecast Inc. copyright 1994.
Search Report dated Oct. 14, 1994.

*Primary Examiner*—Robert Chevalier
*Attorney, Agent, or Firm*—Joseph S. Tripoli; Frederick A. Wein; Peter M. Emanuel

[57] ABSTRACT

The programming of a broadcast receiver is selected from the display and the mapping of the required numbers is fully automatic. The user enters a code and the VCR decodes the entered code to determine the corresponding channel. The VCR then checks to determine if this channel is mapped. If not, the VCR prompts the user to identify which program one wishes to record. A picture on the TV, in a mixed mode, can be used for this, i.e., the TV program selected is shown on the background behind the text. The user uses keys on the remote control to scroll through the list of channels to find the program one wants to record. Once determined, the VCR will automatically map the correct three digit numbers for the program selected. In this way, the user need not know what the selection number represents.

4 Claims, 3 Drawing Sheets

==> MAXIMUM 9 DIGITS CAN BE ENTERED

METHOD FOR PROGRAMMING A BROADCAST RECEIVER

BACKGROUND

The invention relates a method to set the broadcast channel of a receiver. In particular, the present invention concerns method and apparatus for designating a feature by programming with SHOWVIEW/Video Plus+/G-code.

Referring to the prior art, the user is required to:

1) read through a long list of instructions in the manual, 2) look at a long list of 3 digit SHOWVIEW numbers (the 3 digit number is the general code used once, to display on the SHOWVIEW system, on which VCR program channel the TV program channels are available), 3) complete the mapping table, and 4) enter the long list of numbers into the VCR before one can use the SHOWVIEW for timer recording.

This is very tedious procedure and prone to errors. The user does not generally understand what he/she is doing and often gets confused.

SUMMARY OF THE INVENTION

It is an object of the present invention to simplify the correlation between the 3 digit SHOWVIEW number to the program places of the device, and thereby to make it more convenient for the user.

The present invention relates to a method and apparatus for programming a broadcast receiver for a system where, each broadcast is provided with an identification signal transmitted during the broadcast and includes a code number for said broadcast transmitter station.

The present invention includes by the following steps:

a) Recognizing and entering the identification signal for a selected broadcast of a defined transmitting station, b) tuning said receiver until it receives and displays a broadcast of said defined transmitter station at a defined tuning program place, and c) designating said code number of the elected broadcast to said defined program place.

According to aspects of the present invention, a preprogrammed device, like a video recorder, is used for performing the desired designation between the 3 digit SHOWVIEW number and the program places of the device. Programming means that a designation or a concordance between a predetermined transmitter station, to an elected program place number 1, 2, 3. Therefore it is no longer necessary to enter the 3 digit show view number since the equipment automatically evaluates said number for establishing the concordance between said number and the associated program place.

In this way, said programming process becomes much more convenient for the user.

Separately, said broadcast is displayed on the screen of a television receiver so that the user can look at the screen and determine if the picture displayed on the screen corresponds to the picture belonging to said entered identification signal. Said broadcast receiver separately is a video recorder. Said designation process preferably is performed automatically by pushing a button after the receiver has started to display said selected broadcast.

Apparatus for performing said method includes keyboard means for entering said identification signal, control means for tuning said device to different transmitter stations, and control means for establishing said designation between said code number and said program place of the device.

According to a further embodiment of the invention, it can be used for programming a non-programmed device like a video recorder, which means establishing the designation or concordance between the program places number 1, 2, 3 . . . at the receiver to 30 different transmitter stations. This embodiment of the present invention works in the following way:

First, a receiver like a video recorder which is not programmed is provided. This means that the designation between the program places number 1, 2, 3 . . . at the receiver, and the transmitter station which can be received at the place of the receiver, is not yet made.

For establishing said programming, the user enters the complete SHOWVIEW number having, e.g., 9 digits, into a keyboard of the equipment. In a second step the video recorder, starts an electronic tuning control (ETC process). That means, for example, it automatically tunes the receiver to different stations and stops tuning when a station is sensed. The user looks at the screen of the television receiver. After one or more tuning steps, the screen will show the broadcast which corresponds to the broadcast which is defined by the SHOWVIEW number, which was originally entered. Now the user can start the programming process, e.g., designating the transmitter station which just transmits said broadcast to a desired program place, for example, program place number 5.

By this procedure, the programming of a non-programmed video recorder to different transmitter stations, and the designation between said code number for a defined transmitter station and the program place of the receiver, are simultaneously determined.

BRIEF DESCRIPTION OF THE DRAWINGS

Reference is made to the drawings showing two circuits according to the present invention.

DETAILED DESCRIPTION OF THE PREFERRED EMBODIMENT

Figure 1:
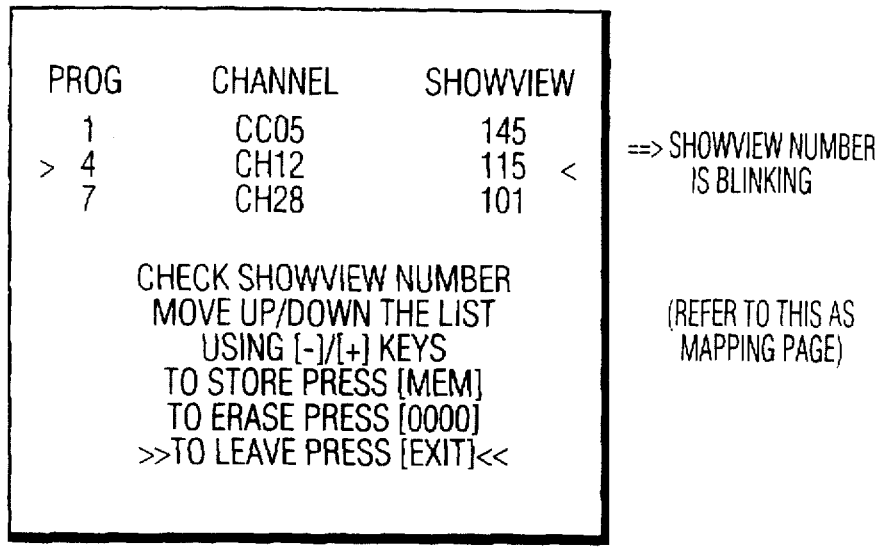
FIGS. 1–3 show prior art mapping pages appearing on the television (TV) screen.

FIG. 1 shows how to map a page appearing on the TV screen. It shows the program number PROG, the broadcast channel, the SHOWVIEW number (SHOWVIEW is blinking) and the commands which can be entered.

Assume that the user completes entering all the SHOWVIEW numbers in the mapping page. After that, one can now perform the SHOWVIEW programming.

Figure 2:
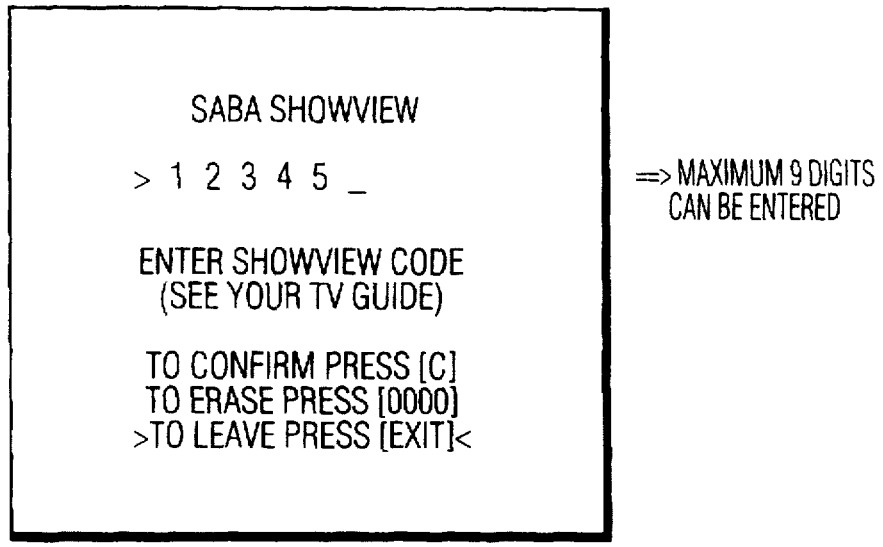

FIG. 2 shows how the SHOWVIEW programming looks on the screen. A maximum of 9 digits of code can be entered. Once entered, and pressing the [C] key on the remote control of the VCR to confirm, the VCR software will decode the number 12345 to the SHOWVIEW channel SV115. Thus, SV115 is mapped to Program PR 4.

Figure 3:
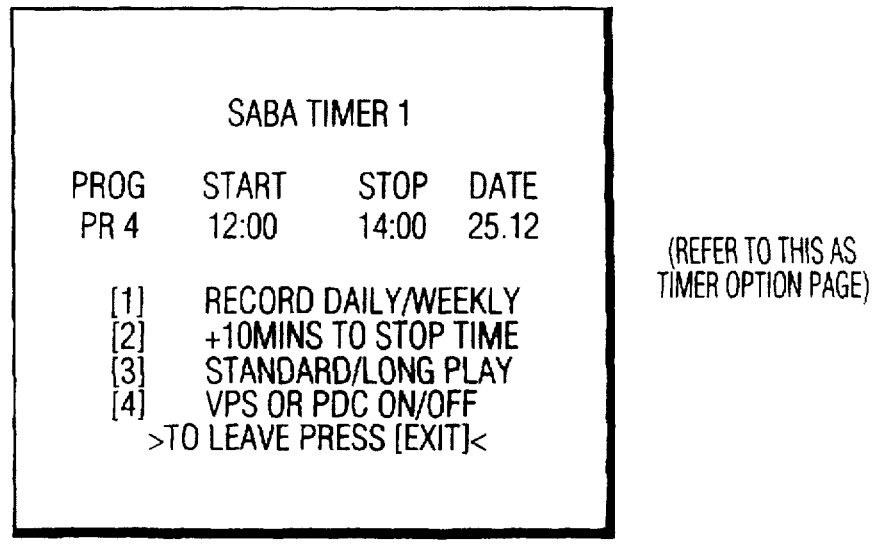

FIG. 3 shows the timer option page according to FIG. 2.

One can choose the options 1 to 4 and press the [EXIT] key when this is done.

Figure 4:
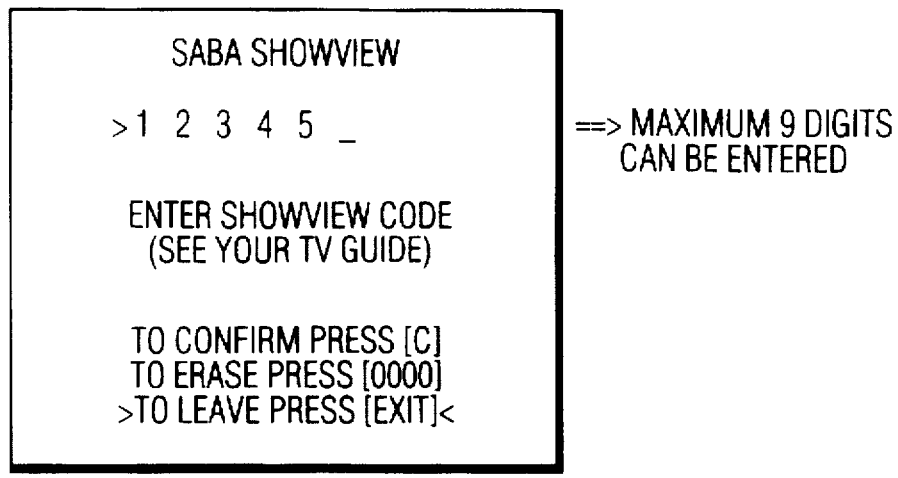
FIGS. 4–8 show mapping pages which appear on the TV screen.

FIG. 4 shows an auto mapping TV screen. The user can skip all the procedures discussed in connection with FIG. 1. Now the user goes straight to SHOWVIEW programming. One enters the SHOWVIEW code. When the user presses

[C], the video recorder (VCR) decodes 12345 to SHOW-VIEW channel SV115. Then the VCR checks and determines that this SHOWVIEW channel SV115 is not mapped.

Figure 5:
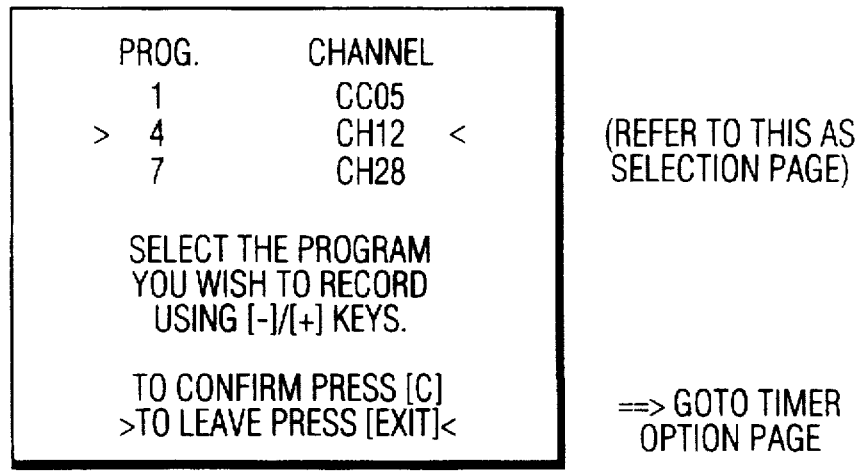

FIG. 5 shows that the VCR then prompts the user to identify which program the user wishes to record. This picture on the TV screen is in "mix" mode. That means, the TV program is 15 shown on the background behind the text. The user uses the [−] or [+] keys on the remote control to scroll through the list of channels to find the program one wants to record. The [C] key is pressed to confirm. The VCR will automatically map SV101 to the program selected (e.g. PR 4).

Figure 6:
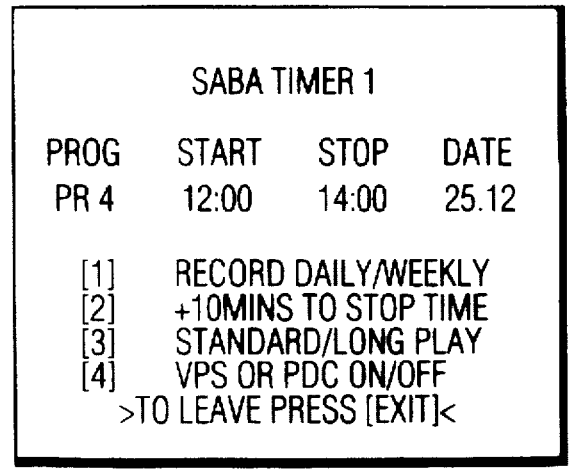

FIG. 6 shows the screen which follows after the confirmation. Thus, the user can get to the same stage by simply selecting the program desired to be recorded, instead of spending many minutes filling up tables and keying in a list of numbers into the VCR. One does not need to know what SHOWVIEW number refers to what TV program. The next time the user enters a SHOWVIEW code for this SHOW-VIEW channel SV115 again, the user will go directly to the TIMER OPTION PAGE (FIG. 6) because SV115 has already been mapped to program 4 PR 4.

Figure 7:
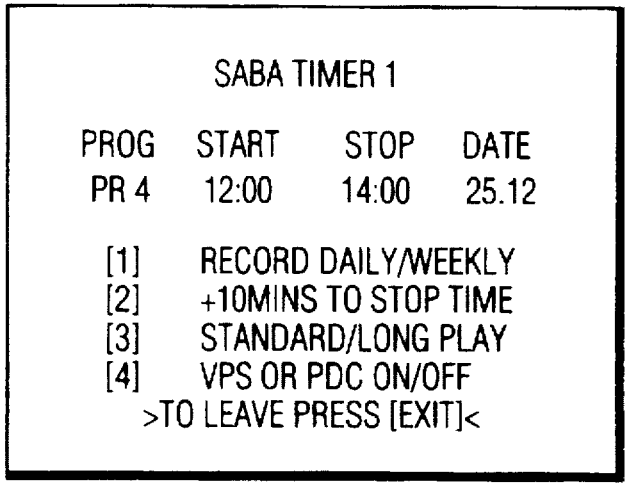

FIG. 7 shows a re-assigning mapping. If the user has somehow selected the wrong program in the selection page, there is a need to re-map. This can be done from the TIMER OPTION PAGE (FIG. 6). At this point, one presses the [−] key to move the cursor back to program PROG entry. The user then changes program 4 PR 4 to PR05 and the exit. The VCR will automatically re-map SV115 to PR05.

A second solution is if the user puts another TV channel into program 4 PR 4. That means, instead of program 4 PR 4 channel 12, one overwrites program 4 PR 4 with channel CH 33. In this case, the VCR will prompt the user with the SELECTION PAGE again when SHOWVIEW is used.

Figure 8:
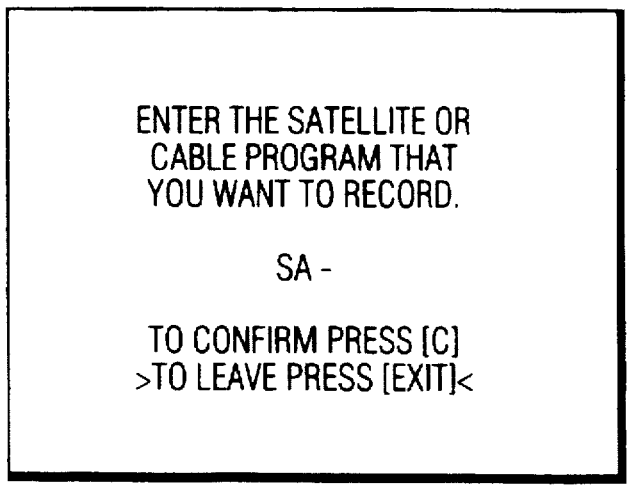

FIG. 8 shows satellite mapping. For the mapping of SHOWVIEW numbers to satellite program numbers (NOT VCR program numbers), the concept of auto mapping is unchanged, except that the selection pages are slightly different. This page is in the "mixed" mode. The user enters the satellite program which one wants to record. If the user does not know what program number to use, the user can switch the channels on the satellite receiver and the picture in the background will change. Once one has found the correct program, one can enter that number into the VCR. The VCR will automatically map the SHOWVIEW number to this satellite program number.

In summary, it can be seen that the user is not exposed to the 3 digit SHOWVIEW number at all. One need not know what the SHOWVIEW number represents. All the user needs to know is which program one wants to record. All the confusing tedious preparations in connection with SHOW-VIEW are eliminated.

All references to "SHOWVIEW" will include VideoPlus+ and G-Code as well.

We claim:

1. A method for helping a user of a broadcast receiver to program the reception of a particular broadcast from an emitting station, said broadcast of said emitting station being provided with an Identification signal transmitted during the broadcast and Including a code number for said broadcast emitting station, comprising the steps of:

inviting the user, by an on screen display, to enter an identification signal of the particular broadcast he wants to receive, decoding the identification signal to find out the code number of said broadcast emitting station, tuning said receiver, starting with already mapped emitting stations, until said code number is found or until all previously mapped emitting stations have been tuned with no one having said code number, if a previously mapped station is found having said code number, then display on-screen information Inviting the user to confirm, if no previously mapped emitting station is found, then continue tuning until an emitting station having said code number is found and display on-screen information to invite the user to allocate a program number to said station.

2. The method according to claim 1, wherein said broadcast is displayed on the screen of a television receiver.

3. The method according to claim 1, wherein said receiver is a video recorder.

4. The method according to claim 1, wherein said designating step is performed automatically by pushing a button after the receiver has started to display said elected program.

* * * * *